(12) United States Patent  
Cheatle

(10) Patent No.: US 8,180,178 B2  
(45) Date of Patent: May 15, 2012

(54) AUTOCROPPING AND AUTOLAYOUT METHOD FOR DIGITAL IMAGES

(75) Inventor: Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 469 days.

(21) Appl. No.: 12/491,087

(22) Filed: Jun. 24, 2009

(65) Prior Publication Data

US 2010/0329588 A1    Dec. 30, 2010

(51) Int. Cl.
 *G06K 9/32* (2006.01)
(52) U.S. Cl. .......................... 382/298; 382/100; 382/173
(58) Field of Classification Search .................. 382/100, 382/298
  See application file for complete search history.

(56) References Cited

U.S. PATENT DOCUMENTS

| | | | |
|---|---|---|---|
| 7,035,477 B2* | 4/2006 | Cheatle | 382/282 |
| 2002/0191861 A1* | 12/2002 | Cheatle | 382/282 |
| 2005/0276477 A1* | 12/2005 | Lin et al. | 382/173 |
| 2006/0257048 A1* | 11/2006 | Lin et al. | 382/276 |
| 2009/0034842 A1* | 2/2009 | Grosvenor | 382/173 |

* cited by examiner

Primary Examiner — Stephen R Koziol

(57) ABSTRACT

The present invention is a method for manipulating acquired digital images in a computer system, comprising creating a crop cost array for each of a set of input images with a set of associated aspect ratios, wherein the cost crop array operates and is stored on the computer system and wherein each element of the array holds a lowest crop cost of an input image for a predetermined aspect ratio, generating plural possible candidate combinations of aspect ratios for the images, wherein one aspect ratio is generated for each image, creating an arrangement of the images for each candidate combination in which each image is cropped to its associated aspect ratio in the candidate combination, evaluating each possible arrangement using a combination of a crop cost of each of the images at their selected aspect ratio and a measure of an aesthetic quality of the layout arrangement, selecting a layout combination with a lowest combined crop cost and layout evaluation score, cropping each image according to a respective aspect ratio in the selected layout combination and arranging the cropped digital images in the selected layout to produce an automatically formatted output layout page.

20 Claims, 11 Drawing Sheets

AUTOCROPPING AND AUTOLAYOUT METHOD FOR DIGITAL IMAGES

BACKGROUND

Automatic electronic cropping of digital images can be used to enhance the appearance of photographs. This is frequently beneficial for consumer photographs where users typically pay little attention to image composition. Cropping can advantageously remove distractions and undesirable areas from edges of images. Automatic cropping can be constrained to generate crops of a particular aspect ratio. An example is a wide panorama which can frequently benefit from having excess areas of sky or foreground removed resulting in a wide aspect ratio.

DETAILED DESCRIPTION OF PREFERRED EMBODIMENT

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1:
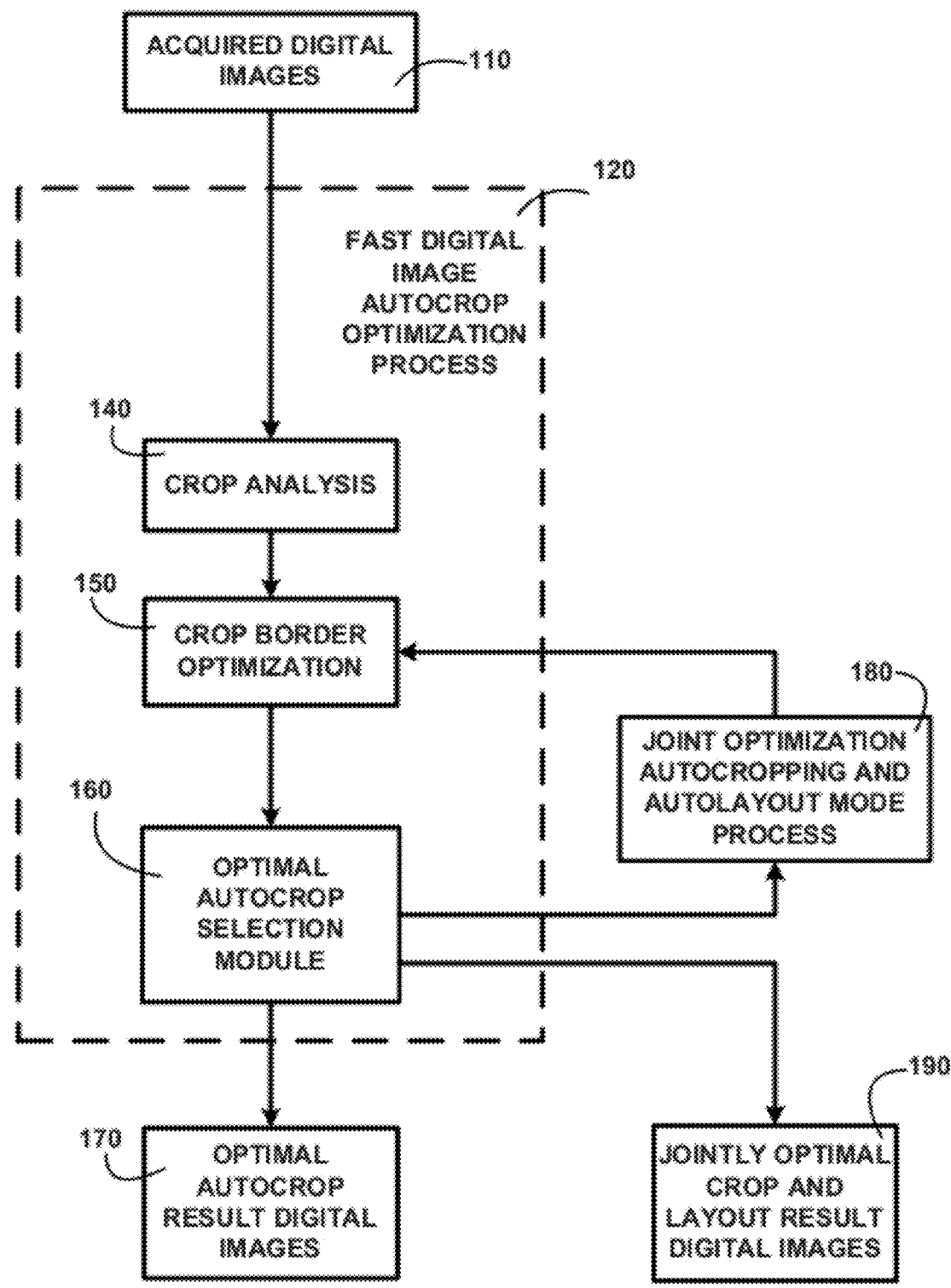
FIG. 1 shows a block diagram of an overview of a fast digital image autocrop optimization process of one embodiment of the present invention.

General Overview:

FIG. 1 shows a block diagram of an overview of a fast digital image autocrop optimization process of one embodiment. A fast digital image autocrop optimization process 120 uses a crop analysis 140 segmentation process to process acquired digital images based on face detection and regions of color clusters of the digital images. The crop analysis 140 segmentation processes provides pixel by pixel analysis of the digital images, which enables faster and considerably more detailed evaluations and decision making processing to produce higher quality optimal autocropping and autolayout results of one embodiment.

In one embodiment, acquired digital images 110 are photographs of real world scenes in digital format. Acquisition can be with methods such as a digital camera or scanned printed photographic images. The descriptions that follow relate to real world scenes as opposed to arbitrary graphics or scanned pages of text.

In one embodiment, the crop analysis 140 locates image segments of people with detectable faces in the acquired digital images. Each face that is detected is used to estimate and create a border of the head and shoulders of the person. The borders of the people identified and located are grouped in one people box segment. The crop analysis 140 also identifies each image pixel by its location in the image and color.

In one example embodiment, numerous image colors are identified within a digital image. A much smaller number of broad color value clusters are selected for use in the analysis. Each pixel is assigned to a representative color cluster based on its own color value. Adjacent pixels of the same color cluster are then grouped into regional segments and classified as subject, background or distraction. The classifications are based on, relative unusualness of the color, region size and location in the image. Classified regions form a saliency map and subject regions are grouped into subject boxes. The core of each subject box is formed by the areas of subject region within the subject bounding box. Each subject box is scored by the size of its core. The classified segment regions allow a much more complete and detailed search of all areas of a digital image for aesthetic criteria significance.

In one embodiment, the areas within the image containing the highest scoring subject box, people box and a central area, such as approximately 15% of the image, are enclosed in one box to form a minimum crop rectangle. The minimum crop rectangle is the least area to be included in any possible crop rectangles. A crop border optimization 150 is an optimization search of possible crop rectangles to determine the optimal autocrop rectangle. This process evaluates the possible crop rectangles and scores each with multiple penalty criteria. Penalty assessments such as too much background or distraction area is within the crop rectangle accrue to each possible crop rectangle. An optimal autocrop selection module 160 then selects the crop rectangle with the lowest penalty score assessment as the optimal autocrop rectangle. The optimal autocrop rectangles can be used to crop the images producing an optimal autocrop result digital images 170 of one embodiment. Automatic cropping can also be constrained to generate a crop for a particular aspect ratio.

In another embodiment, the selected optimal autocrop rectangles of images to be placed in a layout are directed to a joint optimization autocropping and autolayout mode process 180. This process evaluates optimal autocrop rectangles for multiple aspect ratios scoring each with similar penalty assessments. The process then selects and assigns the optimal auto-layout aspect ratio for each image then reprocesses the results in the crop border optimization 150. The reprocessed optimal autocrop rectangles with optimal layout aspect ratios results can be used to crop the images producing jointly optimal crop and layout result digital images 190 and are available for placement in the layout. A detailed description of the elements of FIG. 1 will be discussed below with reference to FIG. 2.

Figure 2:
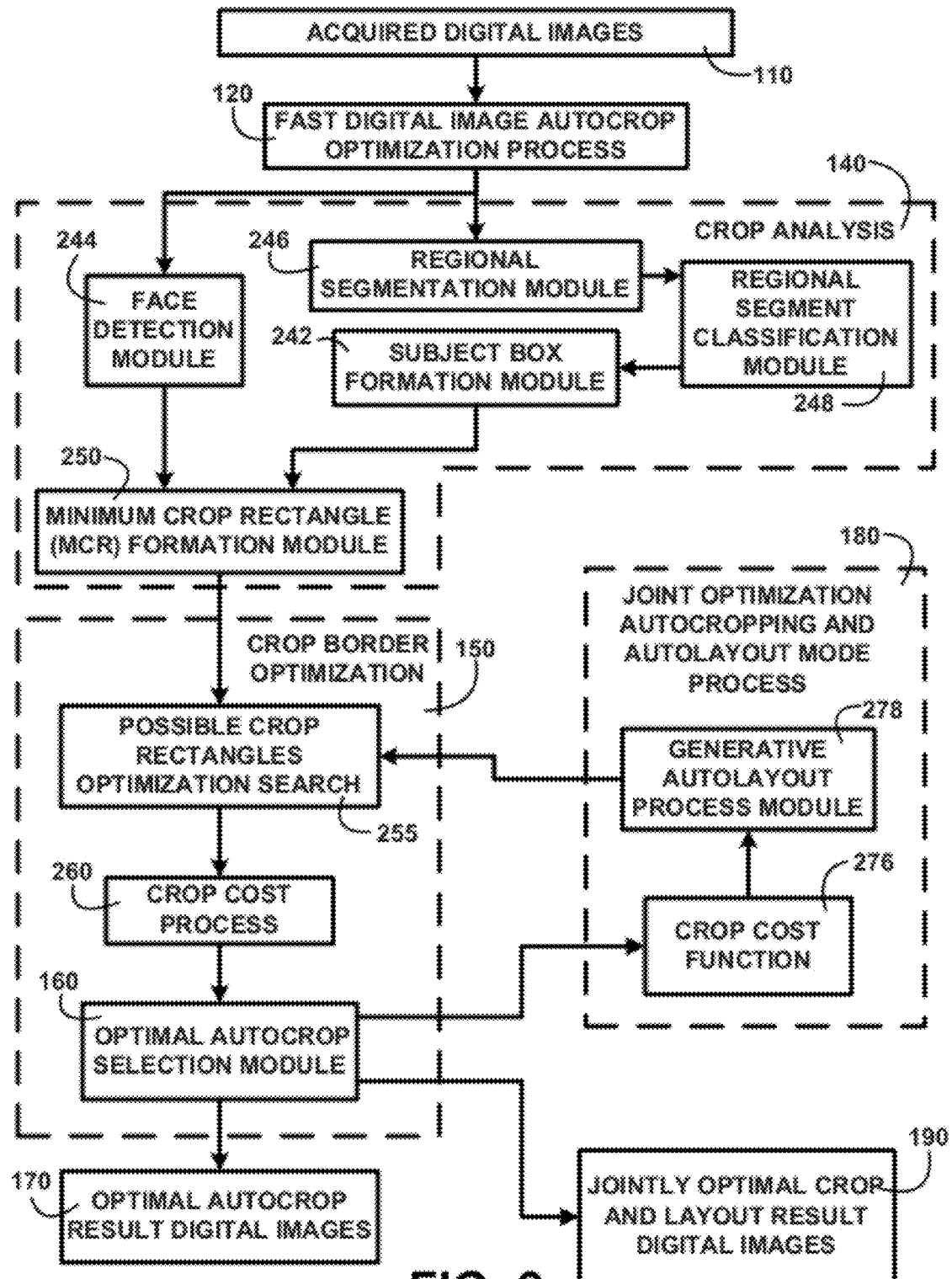
FIG. 2 shows a flow chart overview of the detailed operation of a fast digital image autocrop optimization process in coordinated modes of operation of one embodiment of the present invention.

Detailed Operation:

FIG. 2 shows a flow chart overview of the detailed operation of a fast digital image autocrop optimization process in coordinated modes of operation of one embodiment. In one embodiment, processes for a crop shape and an aspect ratio as a rectangle are shown in FIG. 2. It should be noted that the descriptions that follow, for example, in terms of rectangles and generic aspect ratios are described for illustrative purposes and the underlying principles apply to any arbitrary shapes of image crops and of layout pages. This is because auto-cropping may produce a range of possible shapes, according to its quality function. The space of possible crops along a single dimension, such as aspect ratio, could be described by a crop quality function of many shape dimensions.

Referring to FIG. 1 along with FIG. 2, the fast digital image autocrop optimization process 120 begins with the acquisition of digitally formatted photographs of real world scenes, as opposed to arbitrary graphics, scanned text pages, etc. Some examples of the acquisition of photographs of real world scenes in digital format are family vacation or sporting events captured by a digital camera, scanning of printed photographic images to create a digital representation of an image or accessing digital images stored on an accessible memory media. Once digital images are acquired, through whatever method, the process begins.

FIG. 2 shows the acquired digital images 110 processed into the fast digital image autocrop optimization process 120 of FIG. 1. The fast digital image autocrop optimization process 120 uses the crop analysis 140 which is a segmentation process to analyze salient areas within an image. A detailed description of the elements of the crop analysis will be discussed below with reference to FIGS. 3A, 3B, 4A, 4B, 4C, 5, 6 and 7.

People in a photograph are often the most salient area. A part of the crop analysis 140 is a face detection module 244 that locates people in an image. An estimate is made of the region of the head and shoulders of the person based on the size and position of each face that is detected. The people detected and located are grouped in one people box segment of one embodiment.

The crop analysis 140 also uses a segmentation process to analyze the aesthetic areas of digital images. Each image is identified in segments based on regions of color clusters. A regional segmentation module 246 starts the segmentation process by identifying each image pixel by its location in the image and color. A typical image generally has numerous colors. A much smaller number of broad color value clusters are selected. Each pixel, determined by its color value, is assigned to a representative color cluster of one embodiment.

The regions are evaluated by a regional segment classification module 248 and classified. The probability that a region falls into a specific class is based on a combination of factors including: relative unusualness of the region's color in the image; the region size; and the region's location in the image. The classification types are subject, background and distraction. The identified and classified segment regions allow a much more complete and detailed search of all areas of a digital image for aesthetic criteria significance of one embodiment.

A subject box formation module 242 progresses the evaluation of classified subject regions. Bounding boxes that enclose subject regions are formed including boxes that merge overlapping subject regions and are referred to as subject boxes. A border enclosing the subject regions which do not touch the edges of the image forms the core of the subject box. Each subject box is ranked by the amount of core area of one embodiment.

The minimum crop rectangle (MCR) formation module 250 groups the highest ranking subject box, the people box and a central area, such as 15% of the image area. This creates a minimum crop rectangle that encloses these three elements and establishes the least area to be used in any crop of one embodiment. The minimum crop rectangle results pass to the crop border optimization 150 of FIG. 1. The crop border optimization 150 is a possible crop rectangles optimization search 255 using multiple penalty criteria in an evaluating crop cost process 260 to determine the optimal autocrop rectangle for each digital image. An optimal autocrop selection module 160 then selects the crop boundary for each image with the lowest penalty value to crop the digital images producing the optimal autocrop result digital images 170 of one embodiment.

Automatic cropping can also be constrained by criteria of aspect ratios for digital images to be placed in a layout in one embodiment. Automatic cropping can also select an aspect ratio to suit the image content. In another embodiment, a user can assign the aspect ratios for inclusion in the autocropping optimization search criteria.

In another embodiment, the intermediate results of the optimal autocrop selection module 160 for digital images intended for a layout are directed to the joint optimization autocropping and autolayout mode process 180 of FIG. 1. The possible crop rectangles optimization search 255 can be constrained with an aspect ratio defined by the joint optimization autocropping and autolayout mode process 180 of FIG. 1. If the desired cropping is for placement in a photographic layout, the joint optimization autocropping and autolayout mode process 180 coordinates the autocropping considerations with the autolayout considerations to provide joint optimization of the results for use in a layout.

The optimal autocropping results go through a more intensive evaluation. Each optimal crop rectangle is similarly penalty scored for each of the multiple specific layout aspect ratios in the evaluation criteria. The large numbers of evaluation results are placed in a crop cost values array forming a crop cost function 276, which shows how the crop cost varies with alternative aspect ratio choices. These results are processed by a generative autolayout process module 278. This performs an optimization search of the crop cost values array in all the possible layout arrangement combinations of the set of digital images in the layout for each of the aspect ratios. These image crop combinations are evaluated, together with criteria reflecting the aesthetic quality of the layout arrangement as a whole. The layout arrangement combination with the lowest penalty score is used to select and assign optimal aspect ratios to each of the digital images in the layout set, thereby achieving a joint optimization of crop and layout considerations.

The optimal autolayout aspect ratios assigned to the layout digital images are entered into the optimization search criteria of the crop border optimization 150 of FIG. 1. The digital images for the layout are then reprocessed producing the optimal auto crops constrained for the optimal autolayout aspect ratios. The final selections are used to crop the digital images producing the jointly optimal crop and layout result digital images 190 for use in a layout of one embodiment.

A detailed description of the crop border optimization 150 will be discussed below with reference to FIG. 8. A detailed description of the joint optimization autocropping and auto-layout mode process 180 will be discussed below with reference to FIGS. 9, 10 and 11.

Figure 3A:
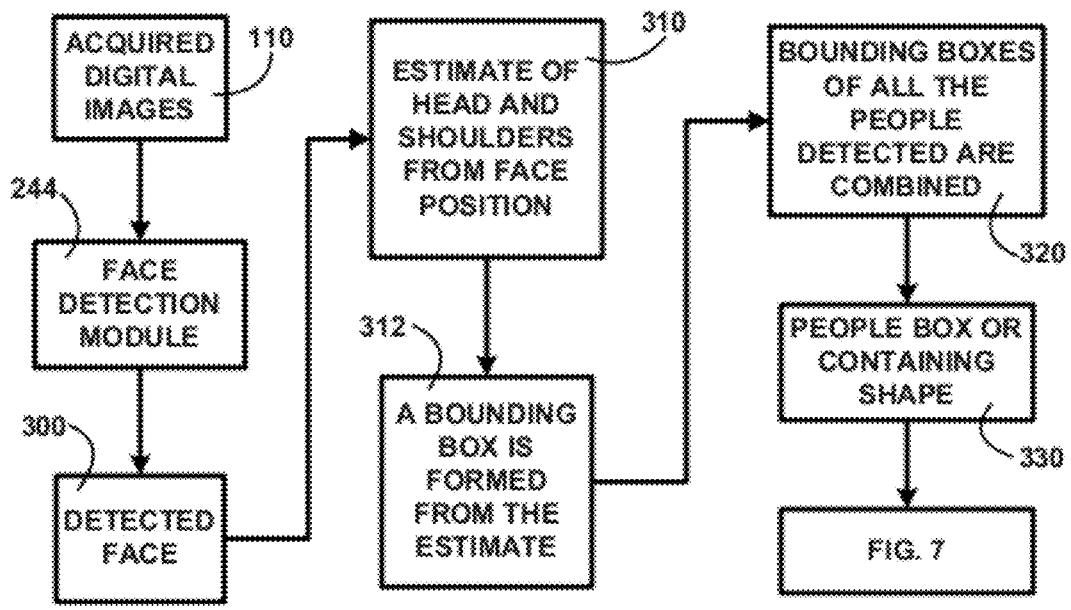
FIG. 3A continues a process from FIG. 2 and which resumes on FIG. 7 and shows a flow chart of a face detection module process of one embodiment of the present invention.
Figure 7:
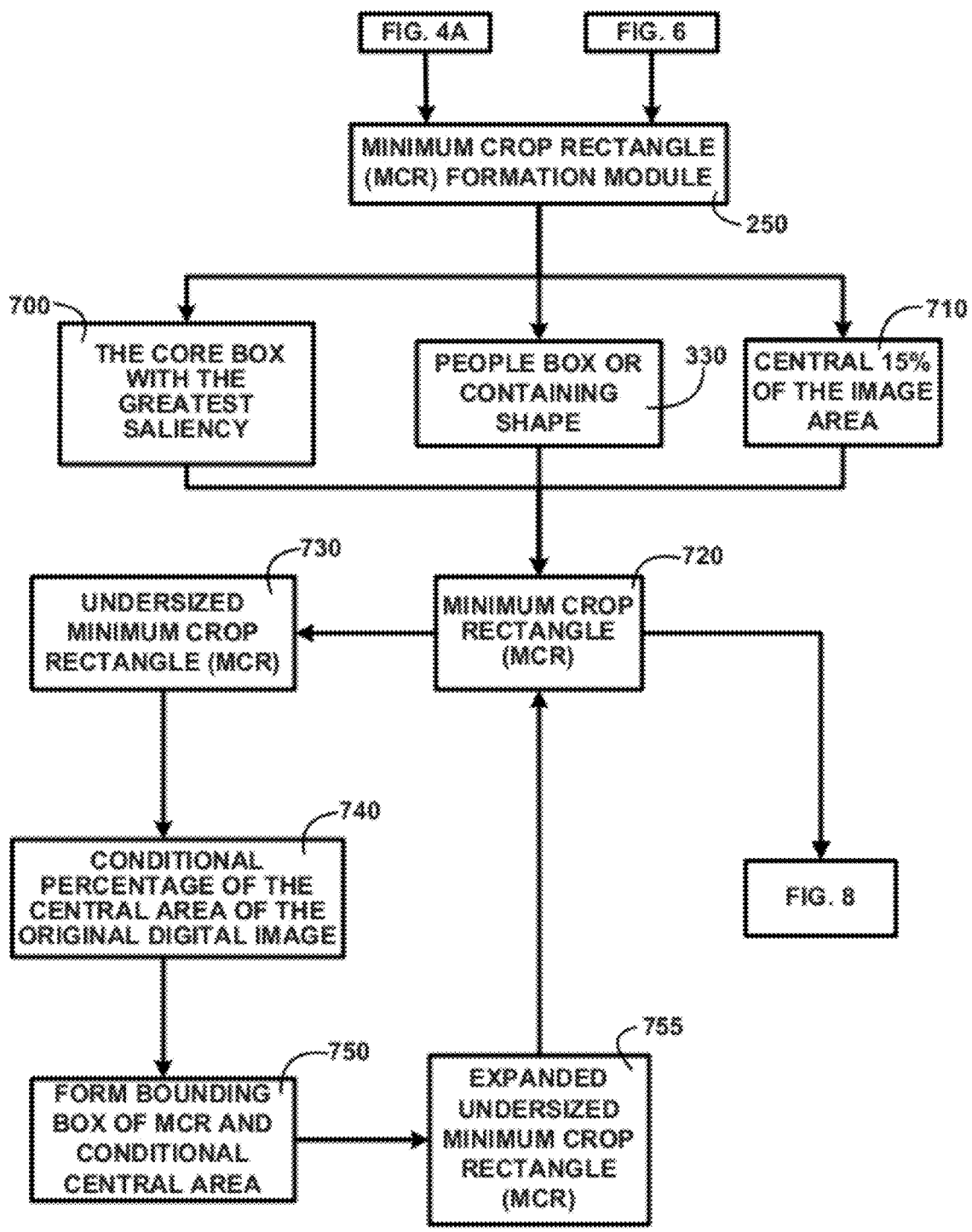
FIG. 7 advances processes from FIG. 3A and FIG. 6 and which continues on FIG. 8 and shows a flow chart of a process of a minimum crop rectangle (MCR) formation module of one embodiment of the present invention.

Face Detection:

FIG. 3A continues a process from FIG. 2 and which resumes on FIG. 7 and shows a flow chart of a face detection module process of one embodiment. Referring to FIG. 1 along with FIG. 2, the fast digital image autocrop optimization process 120 of FIG. 1 has as one process in the crop analysis 140 of FIG. 1 the face detection module 244 as shown in FIG. 3A.

The face detection module 244 processes acquired digital images 110 to detect any face(s) that represent people in the image. People are often in the case of real world scene photographs the objective in capturing the image. This module provides a process to include them in the autocropping analysis. If one or more detected face 300 is found the boundary and position of the detected face 300 is used to process an estimate of head and shoulders from the face position 310 and a bounding box is formed from the estimate 312 of the head and shoulders of one embodiment.

In one embodiment the head and shoulder bounding boxes of all the people detected are combined 320 to form a people box or containing shape 330. The process resumes with the inclusion of these results in the minimum crop rectangle as described on FIG. 7.

Figure 3B:
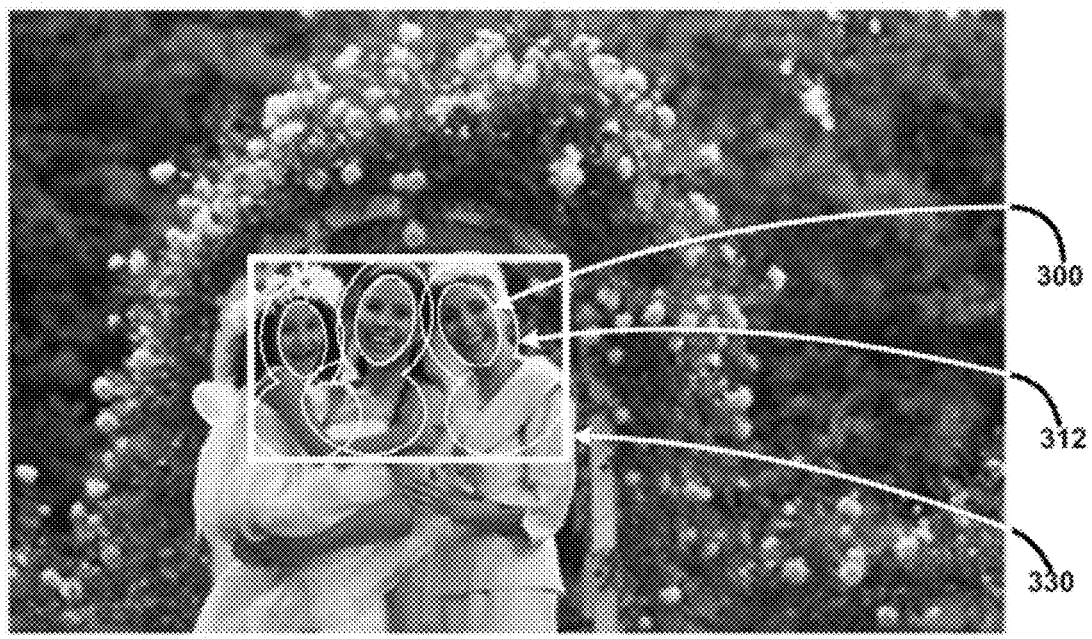
FIG. 3B for illustrative purposes only shows an example of a digital image processed by a face detection module of one embodiment of the present invention.

FIG. 3B for illustrative purposes only shows an example of a digital image processed by a face detection module of one embodiment. FIG. 3B shows a hypothetical example of an acquired digital image with the detected face 300 of FIG. 3A for each person, the bounding box formed from the estimate 312 of FIG. 3A of their head and shoulders and the people box or containing shape 330 of FIG. 3A of one embodiment.

Figure 4A:
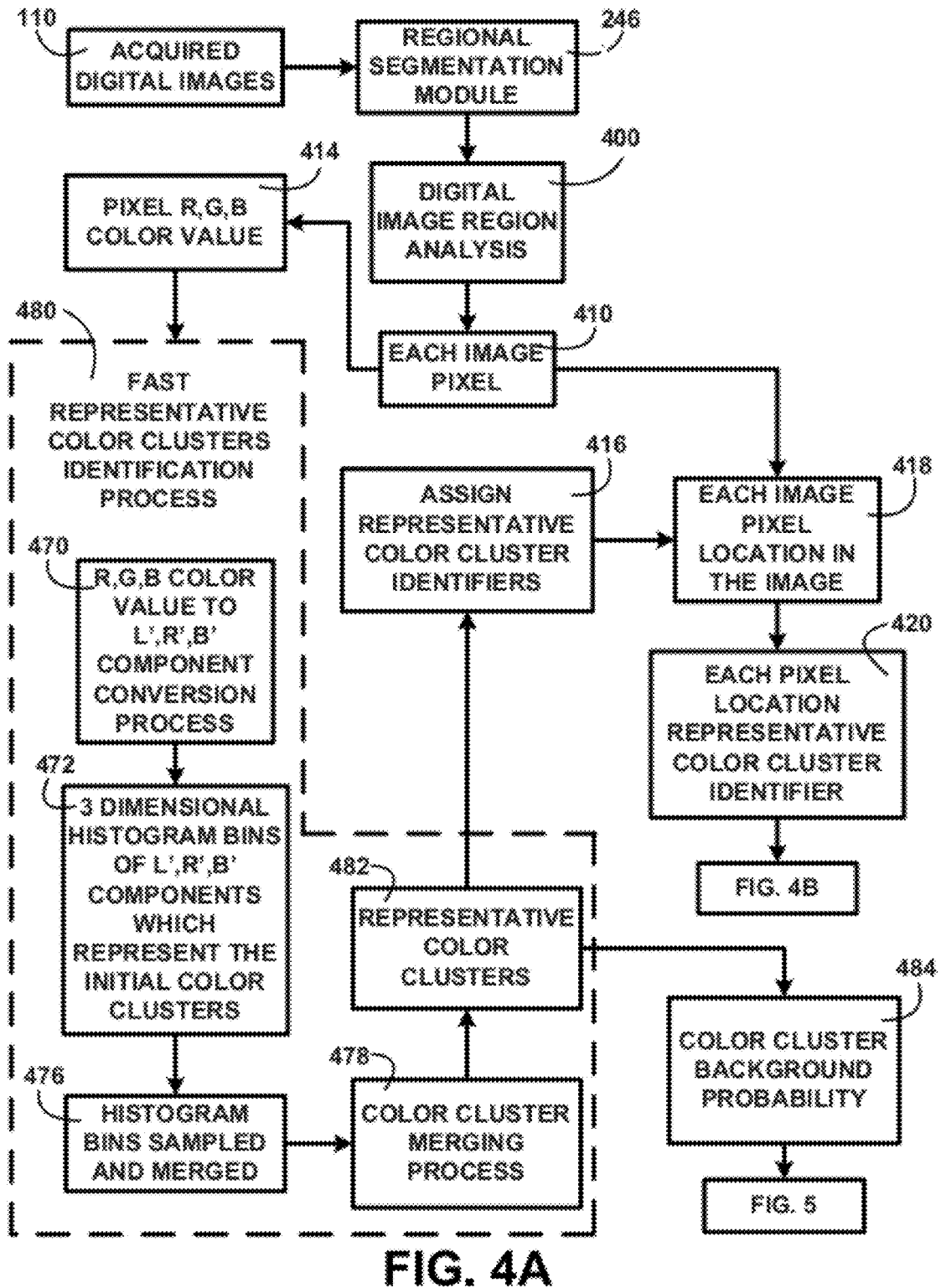
FIG. 4A advances a process from FIG. 2 and which proceeds on FIG. 4B and FIG. 5 and shows a flow chart of a regional segmentation module process of one embodiment of the present invention.
Figure 4B:
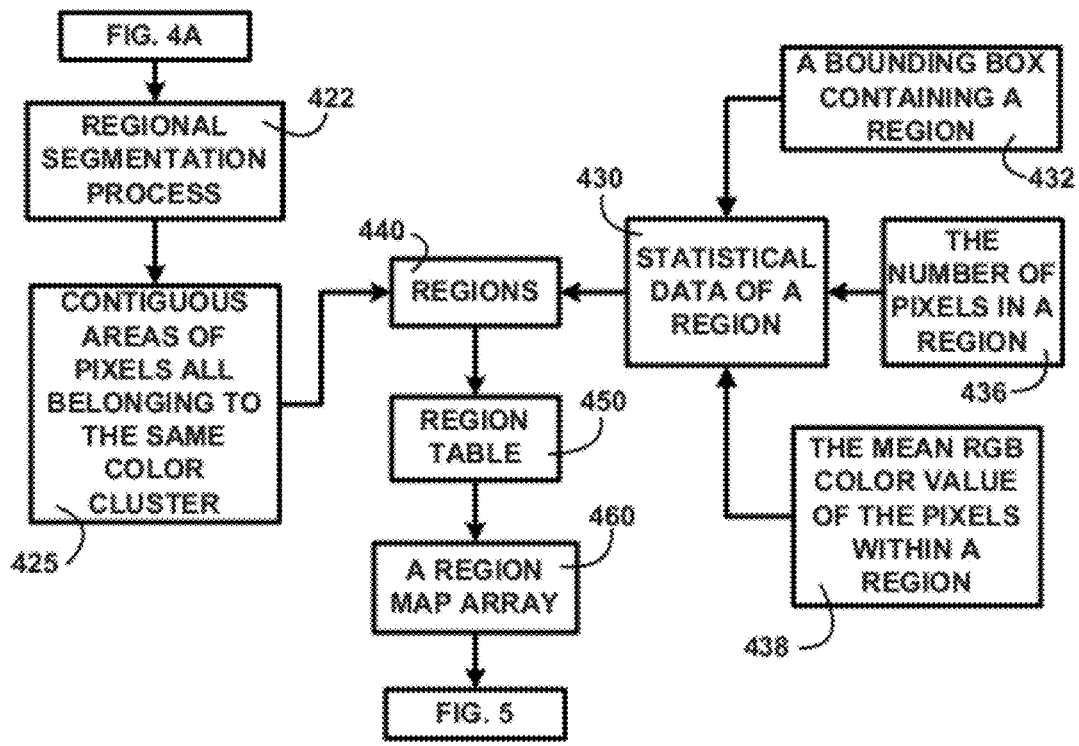
FIG. 4B resumes a process from FIG. 4A and which continues on FIG. 5 and shows a flow chart of a continuation of a regional segmentation module process of one embodiment of the present invention.
Figure 4C:
FIG. 4C for illustrative purposes shows an example of a digital image processed by a regional segmentation module of one embodiment of the present invention.

Regional Segmentation Process:

FIG. 4A advances a process from FIG. 2 and which proceeds on FIG. 4C and shows a flow chart of a regional segmentation module process of one embodiment. Referring to FIG. 1 along with FIG. 2, the fast digital image autocrop optimization process 120 of FIG. 1 has as one process in the crop analysis 140 of FIG. 1 the regional segmentation module 246 of FIG. 2 which identifies areas of similarly colored image pixels and defines them into regions. FIG. 4A begins with the input of the acquired digital images 110 to the regional segmentation module 246 which initially performs three operations: establishment of color clusters, assignment of a color cluster background probability and pixel color cluster identification.

A digital image region analysis 400 analyses once each image pixel 410 to determine the pixel R, G, B color value 414 and each image pixel location in the image 418. In one embodiment a fast representative color clusters identification process 480 first performs an R, G, B color value to L', R', B' component conversion process 470, where L'=R+G+B, R'=R/L' and B'=B/L'. The fast representative color clusters identification process 480 continues to form 3 dimensional histogram bins of L', R', B' components which represent the initial color clusters 472.

An example of an embodiment which is both computationally fast and reflects the perceptual significance of the color space efficiently, is to use histogram bin widths in each of the 3 dimensions of L', R' and B' which are not equal in size or number. In one embodiment the L' dimension is histogrammed using 14 bins of varying widths. R' and B' are sampled using a number of equally sized bins, however the number of bins used is different for each of the 14 L' bins.

L' R', B' components are sampled and merged into other component bins. At the end of this histogramming stage, many of the histogram bins will typically be empty or contain very few pixel samples. Bins with few samples are merged into the non-empty bin with the most similar color. The result of the process of histogram bins sampled and merged 476 is a reduction in the number of color clusters.

This is followed by a further color cluster merging process 478 in which the color clusters with the most similar colors are merged. This is repeated until the number of color clusters has been reduced to a small number of distinct colors, or the color distance between the clusters with the most similar colors exceeds a threshold.

The fast representative color clusters identification process 480 produces representative color clusters 482. The number of representative color clusters 482 is much smaller than the number of colors in a digital image in one embodiment. This process can be implemented very efficiently as each pixel in the original image is accessed once. In one embodiment the color clustering is performed on a blurred and down-scaled version of the original image.

The process assigns a color cluster background probability 484 to the representative color clusters 482 in which large color clusters and color clusters close in color to large color clusters have a high background probability. For example, relatively high background probabilities may be assigned to large regions of green (e.g. grass or foliage), blue (e.g. water or sky) or yellow/brown (e.g. earth or sand), without a large degree of image processing. In one embodiment, these and other relatively simple heuristics are applied to assign a background probability to all clusters of the image. Each cluster is assigned a background probability in the range 0 to 255, but it can be any other convenient range. The color cluster background probability 484 is utilized in the classification of the regions as described in FIG. 5.

In a similar operation, the regional segmentation module 246 proceeds to assign representative color cluster identifiers 416 to each image pixel location in the image 418. Each pixel location representative color cluster identifier 420 is processed further in FIG. 4B of one embodiment. FIG. 4B resumes a process from FIG. 4A and which continues on FIG. 5 and shows a flow chart of a continuation of a regional segmentation module process of one embodiment. The regional segmentation module 246 of FIG. 2 proceeds with a regional segmentation process 422. Now that each pixel location contains its representative color cluster identifier 420 of FIG. 4A the regional segmentation process 422 groups connected pixels in the same color cluster 425 into regions 440.

Statistical data of a region 430 including a bounding box containing a region 432, the number of pixels in a region 436 and the mean color of the pixels within a region 438 are processed into a region table 450. The statistical data of all the regions 440 is processed into the region table 450 which forms a region map array 460 of the entire image area of one embodiment. The region map array 460 contains the regional segment information to be used for segment classification which follows and is described on FIG. 5.

FIG. 4C for illustrative purposes shows an example of a digital image processed by a regional segmentation module of one embodiment. This illustrative example of a digital image processed by the regional segmentation module 246 of FIG. 2 shows areas of adjacent pixels with similarly assigned representative color clusters 425 of FIG. 4B.

Figure 5:
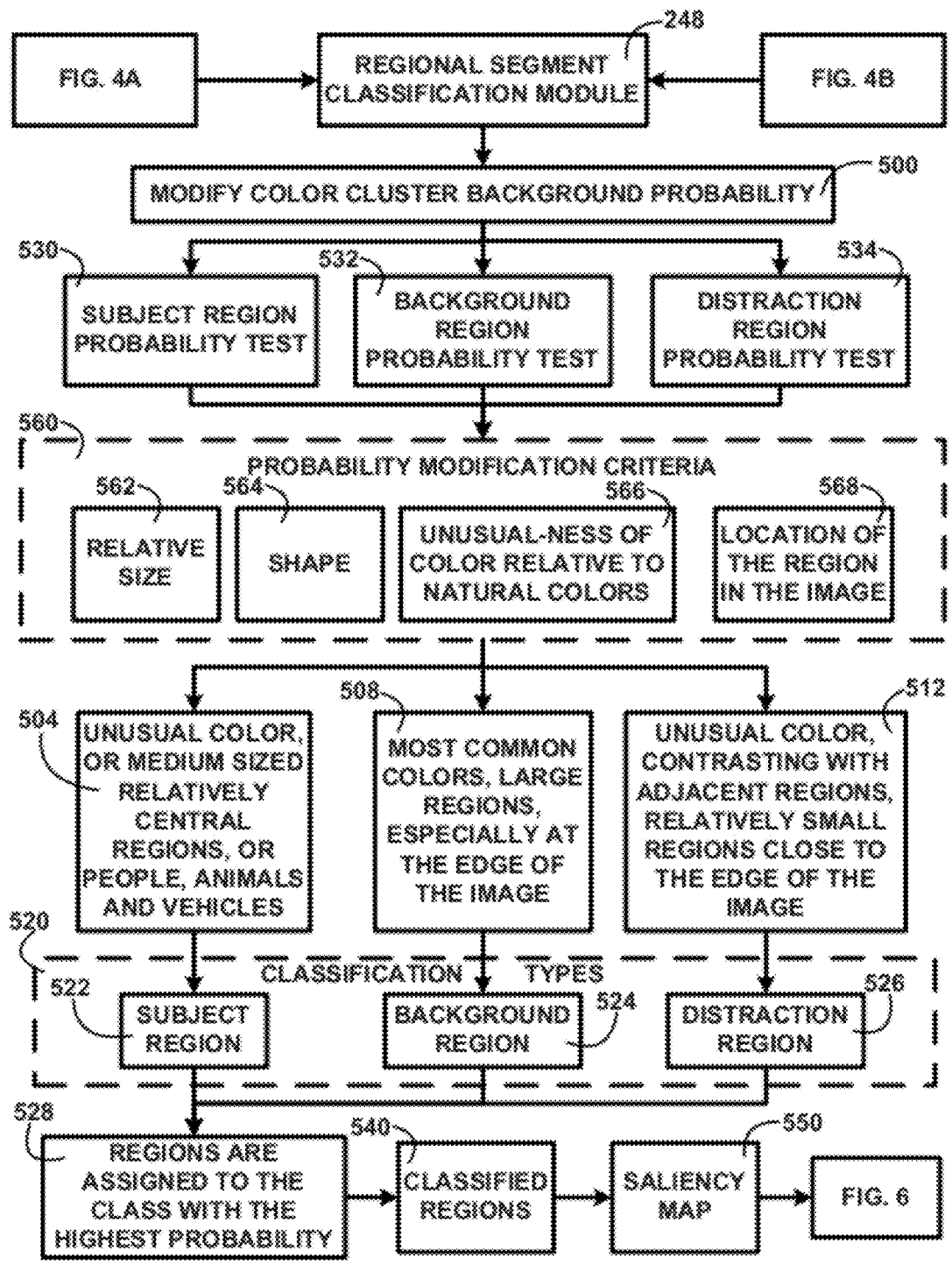
FIG. 5 continues a process from FIG. 4C and which advances on FIG. 6 and shows a flow chart of a regional segmentation classification module process of one embodiment of the present invention.
Figure 6:
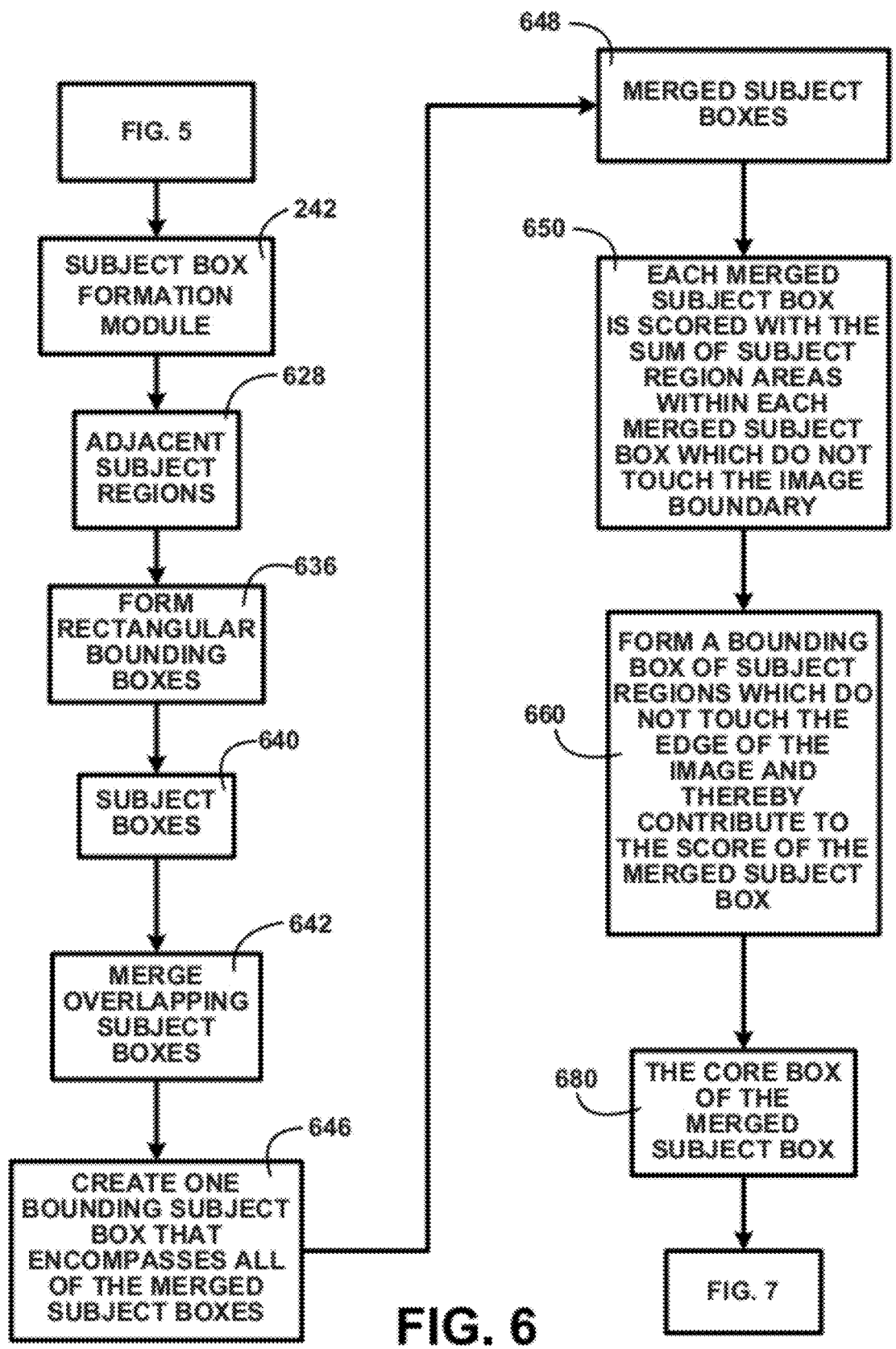
FIG. 6 advances a process from FIG. 5 and which moves ahead on FIG. 7 and shows a flow chart of a subject box formation module process of one embodiment of the present invention.

FIG. 5 continues a process from FIG. 4C and which advances on FIG. 6 and shows a flow chart of a regional segmentation classification module process of one embodiment. In FIG. 5 the regional segment classification module 248 references the region map array 460 of FIG. 4B and the color cluster background probability 484 of FIG. 4A then modifies the color cluster background probability 484 of FIG. 4A of regions based on various measures. These modifications are a method of analyzing and determining the regions saliency in the digital image. The regions are heuristically classified into saliency elements. This is a step in the autocropping process to locate those portions of the digital image that have the highest relative importance. In capturing most images the objects or subjects most desired in the image are usually in the foreground of one embodiment.

The heuristic classification process is based on relatively minimal time to compute features of the segmented regions such as relative size 562, shape 564, unusual-ness of color relative to natural colors 566 and location of the region in the image 568 and can include other criteria to further refine the classifications. For example, strong foreground subjects, which are most salient to a human viewer, tend to be reasonably large, with relatively unusual color, and fairly central in position within the image. Background, on the other hand, which is least salient to a human viewer, tends to comprise large regions with the most common colors, especially when at the edge of the image. Distractions are salient by virtue of their color, and the contrast with adjacent regions, and tend to be relatively small and close to the edge of the image, where such regions are likely to undesirably attract the human visual system of one embodiment.

Subject and distraction regions both have unusual colors, but differ in their size and position. Subject regions are generally medium sized and central in the digital image while distraction regions are located at the edges of the digital image. These distinctions allow the determination and classification of color clusters as distraction regions which prevents unusual color regions at the edge of the digital image from being included in the minimum crop rectangle created in the Minimum Crop Rectangle (MCR) Formation Module 250 of FIG. 2 processing of one embodiment.

The regional segment classification module 248 proceeds to modify the color cluster background probability 484 of FIG. 4A of regions using probability modification criteria 560 to identify the regions by classification types 520. Each region is assigned to one of a set of possible classes which include subject region 522, background region 524 and distraction region 528 at a minimum, an example of additional classes is ignore for very small regions. In general terms, the process uses the color cluster background probability 484 of FIG. 4A in conjunction with region context within the image, such as shape 564 and position criteria relating to the region, to estimate at least three classification probabilities for the region; whether the region is a subject, background or a distraction of one embodiment.

In a first, subject region probability test 530, the starting point for deriving the probability that the region is a subject region, is the inverse of the color cluster background probability 484 of FIG. 4A, which is (1−p) where p is the cluster background probability. This is modified according to appropriate position and shape heuristics. Modification is by increasing the subject region probability if the region is more likely to be a subject region, and decreasing it if the region is less likely to be a subject region of one embodiment.

Region characteristics that tend to identify a salient photographic subject include, for example, unusual color, or medium sized relatively central regions, or people, animals and vehicles 504. Unusual colors relative to natural colors are for example bright colors, high contrast colors or other colors not common to the image. Foreground subjects are usually medium sized regions which are positioned relatively central to the image. Other measures for identifying a subject can apply shape analysis, for example, to identify people, animals and vehicles, each of which can form the subject of photographs of one embodiment.

Regions that closely match the criteria for a subject region effectively have a greatly increased subject region probability as a result of the subject region probability test 530, whereas regions for example nearer the edge of the image, that have a few subject characteristics, will have a reduced subject probability of one embodiment. Other embodiments of the invention are in no way limited to particular ways of identifying a subject.

Second, background region probability test 532 is performed where the probability that the region is a background region is derived directly from the color cluster background probability 484 of FIG. 4A. The inherited color cluster background probability 484 of FIG. 4A for the region is increased or decreased depending on whether a region is deemed to be a background region. Characteristics of a background region, other than cluster size and color, the factors influencing the cluster background probability, include whether the region has most common colors, large regions, especially at the edge of the image 508. For example, regions that are relatively large will tend to have a relatively higher background region probability, with that probability increasing as the region is closer to the edge of the image. On the other hand, a relatively large region that has natural colors is generally indicating background, but is nearer to the center, will have a relatively lower background region probability, as a result of the background region probability test 532 of one embodiment.

Third, distraction region probability test 534 is performed, as with the subject region probability, the starting point for deriving the probability that the region is a subject region, that is the distraction region probability, is the inverse of the color cluster background probability 484 of FIG. 4A, modified according to region position and shape based heuristics. Modification is by increasing or decreasing the distraction region probability depending on whether or not the region has the characteristics of a distraction. Exemplary characteristics of a distraction are that the respective region has an unusual color contrasting with adjacent regions, relatively small regions close to the edge of the image 512 of one embodiment.

The distraction region probability test 534 has the benefit of being able to identify regions that have a high subject probability, for example, due to unusual color and size, but low perceived salience, for example, because the region is not central in an image. In effect, the distraction region probability test 534 greatly increases the degree of image understanding for the purposes of more accurate image enhancement. A distraction might, for example, be the brightly colored clothing of a stranger who is accidentally caught at the edge of an image. Such an image region would naturally and undesirably attract a viewer's attention without image processing according to embodiments.

The three aforementioned probability tests derive respective region probabilities by increasing or decreasing the color cluster background probability 484 of FIG. 4A or the inverse thereof, as the case requires, by amounts related to (for example proportional to) the degree of certainty that a region does or does not match the respective tests' heuristic criteria, to promote salient regions and relegate non-salient regions. As the probability tests are completed the regions are assigned to the class with the highest probability 528 on the basis of which of the subject probability, background probability and distraction probability has the highest value for the respective region the assignment is to one of the three classes, subject, background, or distraction. The process then uses the classified regions 540 to produce a segmented image saliency map 550 of one embodiment.

FIG. 6 advances a process from FIG. 5 and which moves ahead on FIG. 7 and shows a flow chart of a subject box formation module process of one embodiment. FIG. 6 illustrates the subject box formation module 242 processing the classified regions 540 of FIG. 5 into subject boxes to identify segment regions of significant saliency.

The subject box formation module 242 finds groups of connected subject regions 628. The rectangular bounding boxes 636 of those regions form subject boxes 640 that have high salience in the image. The process moves ahead to merge overlapping subject boxes 642 and create one bounding subject box for each group of overlapping subject boxes 646. The resulting merged subject boxes 648 are scored. Each merged subject box is scored with the sum of subject region areas within each merged subject box which do not touch the image boundary 650.

The process continues to form a bounding box of subject regions which do not touch the edge of the image and thereby contribute to the score of the merged subject box 660. This is called the core box of the merged subject box 680. This core box may actually be any shape or with irregularly formed borders of one embodiment. The process resumes with the inclusion of these results in the minimum crop rectangle as described on FIG. 7. This completes the crop analysis 140 of FIG. 1 processes.

Figure 8:
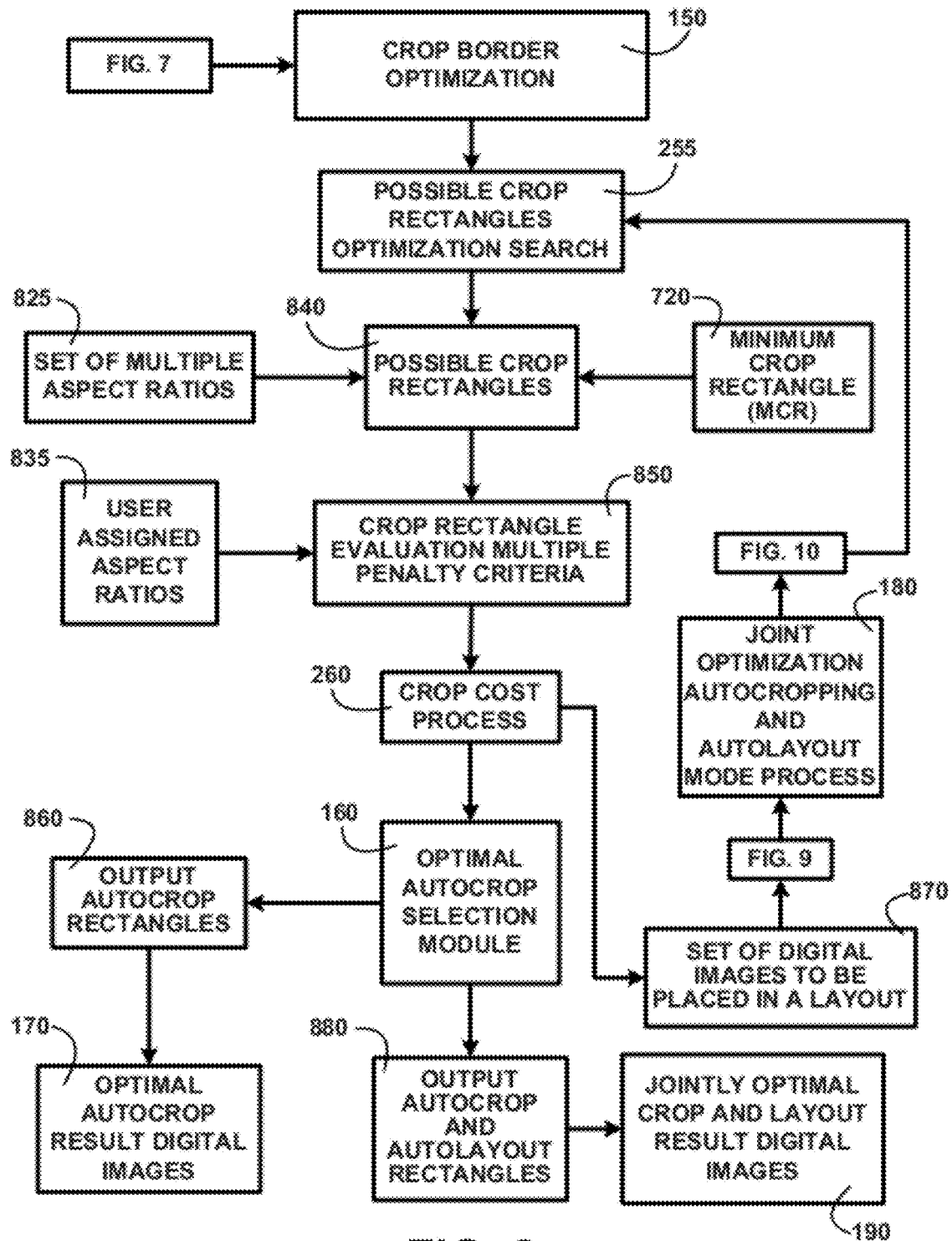
FIG. 8 advances a process from FIG. 7 and shows a flow chart of a crop border optimization of one embodiment of the present invention.

Minimum Crop Rectangle (MCR) Formation:

FIG. 7 advances processes from FIG. 3A and FIG. 6 and which continues on FIG. 8 and shows a flow chart of a process of a minimum crop rectangle (MCR) formation module of one embodiment. FIG. 7 shows the continuation of the crop analysis 140 of FIG. 1 from FIG. 3A and FIG. 6 being processed by the minimum crop rectangle (MCR) formation module 250.

The minimum crop rectangle (MCR) formation module 250 forms a bounding box which includes the core box with the greatest saliency 700 and which is expanded to additionally include the people box or containing shape 330 and the central 15% of the image area 710. The resulting bounding box is a minimum crop rectangle (MCR) 720 which represents the least area to be included in a crop of one embodiment.

The area of the minimum crop rectangle (MCR) 720 is analyzed to prevent erroneous cropping. An undersized minimum crop rectangle (MCR) 730 is detected in cases where the minimum crop rectangle (MCR) 720 is less than 20% of an original image area, or within a minimum crop rectangle (MCR) 730 the area of subject boxes 640 of FIG. 6 is less than 10% of the original image area.

The undersized minimum crop rectangle (MCR) 730 is expanded to include a conditional percentage of the central area of the original digital image 740. In one embodiment the conditional percentage is the central 25% of the original image area instead of the central 15% of the image area 710. The process proceeds to form bounding box of MCR and conditional central area 750 which expands the area of the undersized minimum crop rectangle (MCR) 730. The boundary of this expanded MCR is referred to as an expanded undersized minimum crop rectangle (MCR) 755 and becomes the minimum crop rectangle (MCR) 720. The minimum crop rectangle (MCR) 720 is forwarded to the crop border optimization detailed in FIG. 8 of one embodiment.

Crop Border Optimization:

FIG. 8 advances a process from FIG. 7 and shows a flow chart of a crop border optimization of one embodiment. FIG. 8 illustrates the crop border optimization 150 processing the possible crop rectangles optimization search 255. Possible crop rectangles 840 are evaluated, and scored in the crop cost process 260 resulting in the selection of the optimal autocrop rectangles. The resulting optimal autocrop rectangles are used to crop digital images and produce the optimal autocrop result digital images 170 of one embodiment.

Possible crop rectangles 840 all include the minimum crop rectangle (MCR) 720. The possible crop rectangles 840 are formed using a set of multiple aspect ratios 825. In one embodiment flexibility is provided which allows user assigned aspect ratios 835 interface. This allows the user to include an additional aspect ratios or the user instruct the crop rectangle evaluation multiple penalty criteria 850 to continue the evaluation of possible crop rectangles having no restrictions on the aspect ratios of one embodiment. The possible crop rectangles 840 once formed are evaluated using crop rectangle evaluation multiple penalty criteria 850.

In another embodiment a set of digital images to be placed in a layout 870 are processed to the joint optimization autocropping and autolayout mode process 180 of FIG. 1. The one optimal autolayout aspect ratio selected for each image resulting from the joint optimization autocropping and autolayout mode process 180 can be utilized as a restriction in the crop rectangle evaluation multiple penalty criteria 850.

The crop rectangle evaluation uses the crop cost process 260. The crop cost process 260 assesses crop cost value penalties for each possible crop rectangle using the segmentation crop analysis results.

Penalties accrue for inclusion of larger background region 524 of FIG. 5 and/or distraction regions 526 of FIG. 5 areas. Crop boundaries which are too close to the minimum crop rectangle (MCR) 720 are penalized. Additional penalties arise for crop boundaries which are too close to other subject boxes 640 of FIG. 6 regional boundaries. Also, for crop boundaries which cross lots of subject boxes 640 of FIG. 6 regional boundaries, especially if the subject boxes 640 of FIG. 6 regional boundaries crossed do not touch an edge of an original digital image of one embodiment.

The various separate crop penalties can be combined into a single penalty by means of a weighted sum. Alternatively, some penalties may be deemed to be so bad that they alone cause an unacceptably high penalty. The evaluation can be processed very efficiently with a coarse search to find an approximate optimal crop which is then redefined further by a local fine search. The search of the areas of a digital image is explored much more exhaustively but allows many relatively sophisticated aesthetic constraints to be combined. The aesthetic criteria are evaluated and scored using more sophisticated techniques which take into account the detailed shape of the core box of the merged subject box 680 of FIG. 6 as well as major region boundaries in background areas of one embodiment.

In one embodiment an example of a more sophisticated technique mechanism is described as follows. The crop penalty evaluation for a candidate crop rectangle is given by $P=(Pt+Pb+Pl+Pr)*Pa*Pd$, where Pt, Pb, Pl, and Pr are penalties for the top, bottom, left and right edges of the candidate crop rectangle, Pa is a penalty for the area of the crop rectangle, and Pd is a penalty for the inclusion of distraction areas. The edge penalties are defined as the sum of pixel edge penalty values, Pp, for each pixel along an edge. Pp=Wm*MCR( )+Wp*PEdge( )+Wc*CEdge( ).

MCR( ) is a penalty function which increases from 0 for pixels which are close to the Minimum Crop Rectangle. PEdge( ) is a function which increases from 0 for pixels which are close to edges of regions where the edge of the region is approximately parallel to the edge of the crop candidate. The function produces a higher penalty component for region edges which are closer to the pixel and for region edges which have a higher color difference across the region edge. CEdge( ) is a function which penalizes a crop candidate edge which crosses a region boundary. The penalty is higher the larger the color difference across the region boundary being crossed by the crop candidate edge. The penalty may be increased if the edge is the edge of a region which has been classified as "subject", and increased further if the subject edge does not touch the edge of the image. Wm, Wp, Wc are weighting multipliers which can be used to balance the effects of the different contributory factors.

The area penalty multiplier, Pa, causes the evaluation function to select small area crops. The degree of bias is controlled by a weight, Wa. In one embodiment Pa increases linearly from 1.0 to the maximum area weight, Wa, as the value of MAX(Lim, Ac/A) increases from a lower limit, Lim, (such as 0.2), to 1.0. Ac is the area of the candidate crop rectangle and A is the area of the full image.

The distraction area multiplier, Pd, is 1.0+Wd*D/A where D=the number of pixels in regions classified as distractions within the candidate crop rectangle. Wd is a weight which controls how strongly the inclusion of distraction areas is penalized. D can be calculated efficiently for evaluating multiple candidate crop rectangles by using an integral image.

This example mechanism for evaluating candidate crop rectangles has the advantage that it can be calculated very efficiently by using integral images for both the calculation of the edge penalties and the distraction penalty. The efficient computation permits a more thorough search of the space of possible crop rectangles within a given computation time.

The crop cost process 260 finds crop borders which leave space around the minimum crop rectangle (MCR) 720, while still producing a reasonably tight crop, rather than simply cropping the salient regions of interest. The crop cost process 260 completes the scoring of the crop cost value penalties for each possible crop rectangle for each of the digital images of one embodiment.

The optimal autocrop selection module 160 then selects the crop rectangle for each image with the lowest penalty score as the output autocrop rectangle 860. The output autocrop rectangle 860 can then be used to crop each image and produce the optimal autocrop result digital image 170 of one embodiment.

In another embodiment, instead of generating a single optimal autocrop rectangle, the algorithm creates a table of penalty values for each of a set of aspect ratios, and additionally the crop rectangle for each aspect ratio which scored the optimal penalty value. If a sufficiently dense sampling of aspect ratio values is used to build this table, it can be used to estimate the crop penalty for any aspect ratio by interpolating between the nearest defined values. The function can be used by the joint optimization autocropping and autolayout mode process 180 of FIG. 2 in FIG. 9 for optimal autolayout aspect ratio selection. The results from that processing are used as aspect ratio constraints in the crop rectangle evaluation multiple penalty criteria 850 to reprocess the set of digital images to be placed in a layout 870 through the optimal autocropping process optimization search. The reprocessed results are selected by the optimal autocrop selection module 160 of FIG. 2 as output autocrop and autolayout rectangles 880 and can be used to crop the images producing jointly optimal crop and layout result digital images 190 for placement in the layout.

The search techniques and evaluation processes in the fast digital image autocrop optimization process 120 of FIG. 1 are very much improved over current methods. The fast digital image autocrop optimization process 120 of FIG. 1 thusly provides a fast efficient method for automatically generating the optimal crop of digital images for use separately or in conjunction with photographic layouts.

Joint Optimization of Digital Image Autocropping and Autolayout:

The fast digital image autocrop optimization process 120 of FIG. 1 selects the sub-area of the image which is most aesthetically appealing. Each image in a group of images can be autocropped to generate the most appealing crop of each image based on its content, independent of the other images in the group. A layout is a grouping of a set of digital images to be placed in a layout target area. The layout defines the relative size and position of each image in the set. This makes the relationship of one image in the set dependent on the other images in the set.

Current processes apply autocropping to images first and then use separate systems to arrange the cropped images in a layout. High quality results are sacrificed since automatic cropping is done without knowledge of the layout optimization criteria and the cropping cannot be adjusted to produce much more pleasing layouts. Likewise the user may wish to interact with an existing layout and make changes, but currently is limited to generalized changes to the aspect ratios since cropping cannot be adjusted.

The joint optimization autocropping and autolayout mode process 180 provides the ability to adjust the cropping in consideration of the desired layout requirements, broad flexibility in making refined adjustments to the layout arrangements, image by image, in consideration of the other images in the arrangement and across many layout criteria such as aspect ratio, size and position.

The joint optimization autocropping and autolayout mode process 180 does all this in one fast, efficient and flexible operation that produces very pleasing high quality autolayout results.

Figure 9:
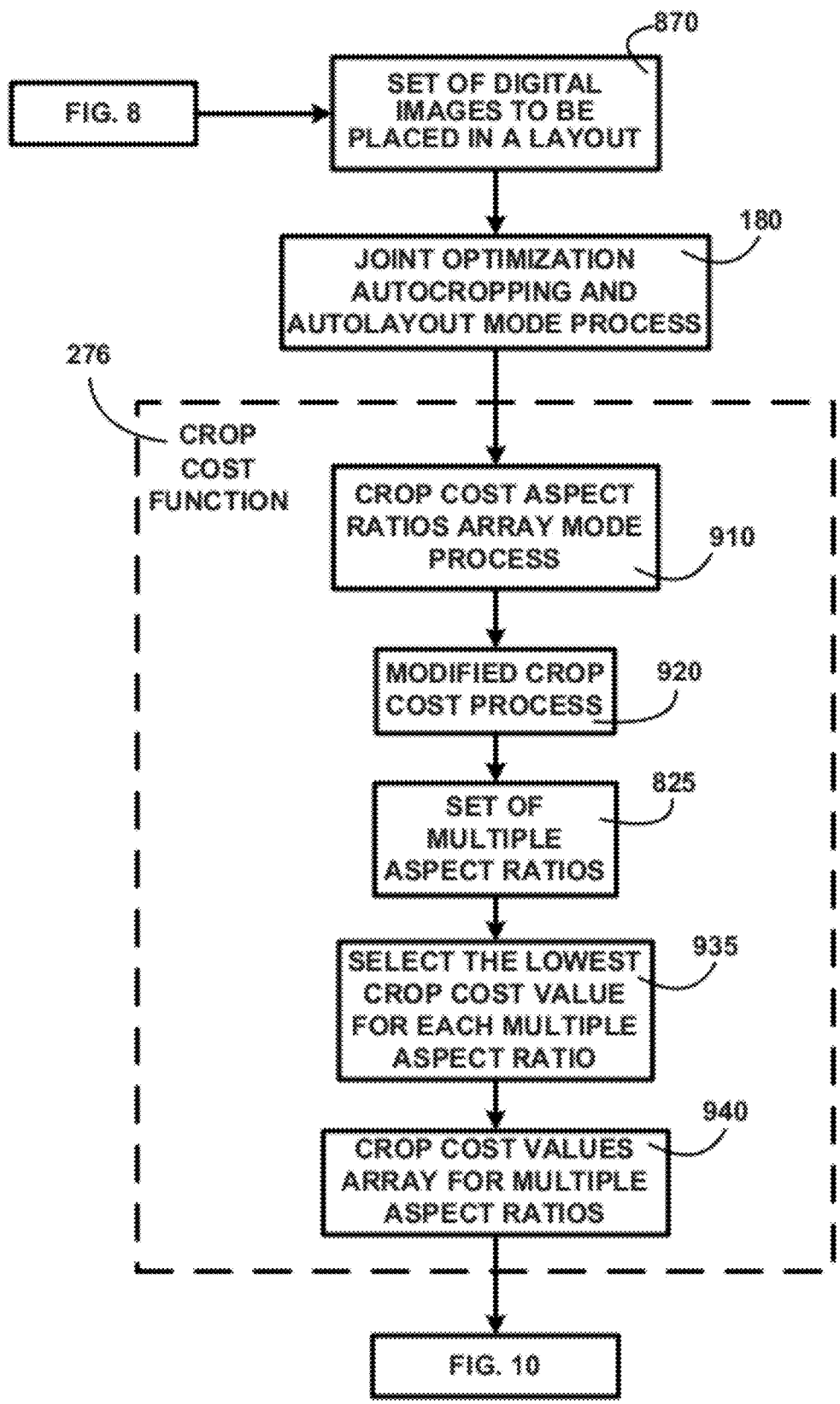
FIG. 9 goes forward with a process from FIG. 8 showing a flow chart of a joint optimization autocropping and autolayout mode process of one embodiment of the present invention.

Crop Cost Function:

FIG. 9 goes forward with a process from FIG. 8 showing a flow chart of a joint optimization autocropping and autolayout mode process of one embodiment. Referring to FIG. 1 along with FIG. 2 autocropping is capable of selecting an aspect ratio to suit the image content. Autocropping can be constrained by aspect ratios in the search criteria.

Optimal autolayout aspect ratios can be determined and included in the autocropping optimization search criteria for digital images to be placed in a layout by the joint optimization autocropping and autolayout mode process 180. The first step in the joint optimization autocropping and autolayout mode process 180 is the crop cost function 276 which implements a crop cost aspect ratios array mode process 910. A crop cost aspect ratios array mode process 910 evaluates each of the possible crop rectangles 840 of FIG. 8 for each of the digital images in the set of digital images to be placed in a layout 870 using the results of the crop analysis 140 of FIG. 1 in the evaluation process.

The evaluation begins when a modified crop cost process 920 scores a crop cost value for each image in the set for each aspect ratio in the set of multiple aspect ratios 825. The scoring is processed regardless of the size and position of the particular image ultimately in the layout of one embodiment.

The process proceeds to select the lowest crop cost value for each multiple aspect ratio 935 for each image. The process records the crop cost value score for each evaluation in a crop cost values array for multiple aspect ratios 940. This array of crop cost values for each image in the set at each of the specific aspect ratios becomes records the results of the crop cost function 276. Instead of scoring just the lowest crop cost value of an image crop rectangle defined by one aspect ratio the crop cost function 276 generates multiple crop cost values for each digital image for each of the various aspect ratios. The results of the crop cost function 276 are used in subsequent processes.

TABLE 1 show for illustrative purposes only a hypothetical example of the crop cost values array for multiple aspect ratios 940 which becomes the results of the crop cost function 276. Note that not all images have the same set of aspect ratio values being evaluated. A more sophisticated embodiment dynamically decides where additional aspect ratio values might be useful, based on how significantly the crop cost changes between two already calculated aspect ratio values.

TABLE 1

| Crop Cost Function | Layout Image No. 1 | Layout Image No. 2 | Layout Image No. 3 | Layout Image No. 4 | Layout Image No. 5 | Layout Image No. 6 | Layout Image No. 7 |
|---|---|---|---|---|---|---|---|
| Aspect Ratio 0.5  | −13 | −12 | −7  | −6 | −11 | −4  | −7 |
| Aspect Ratio 0.66 | −12 | −11 | −5  | −4 | −9  | −6  | −6 |
| Aspect Ratio 0.75 | −11 | −10 | −6  | −2 | −7  | −8  | −5 |
| Aspect Ratio 1.0  | −10 | −9  | −9  | −3 | −6  | −10 | −3 |
| Aspect Ratio 1.5  | −4  | −6  | −10 | −5 | −3  | −12 | −4 |
| Aspect Ratio 2.0  | −7  | −5  | −11 | −7 | −5  | −14 | −8 |
| Aspect Ratio 3.0  | −8  | −7  | −12 | −8 | −7  | −15 | −9 |

In another embodiment the analysis of the autocrop of each image is saved so that when a specific aspect ratio crop is requested it can quickly be recomputed. This is simple to do, with relatively low memory overhead.

Figure 10:
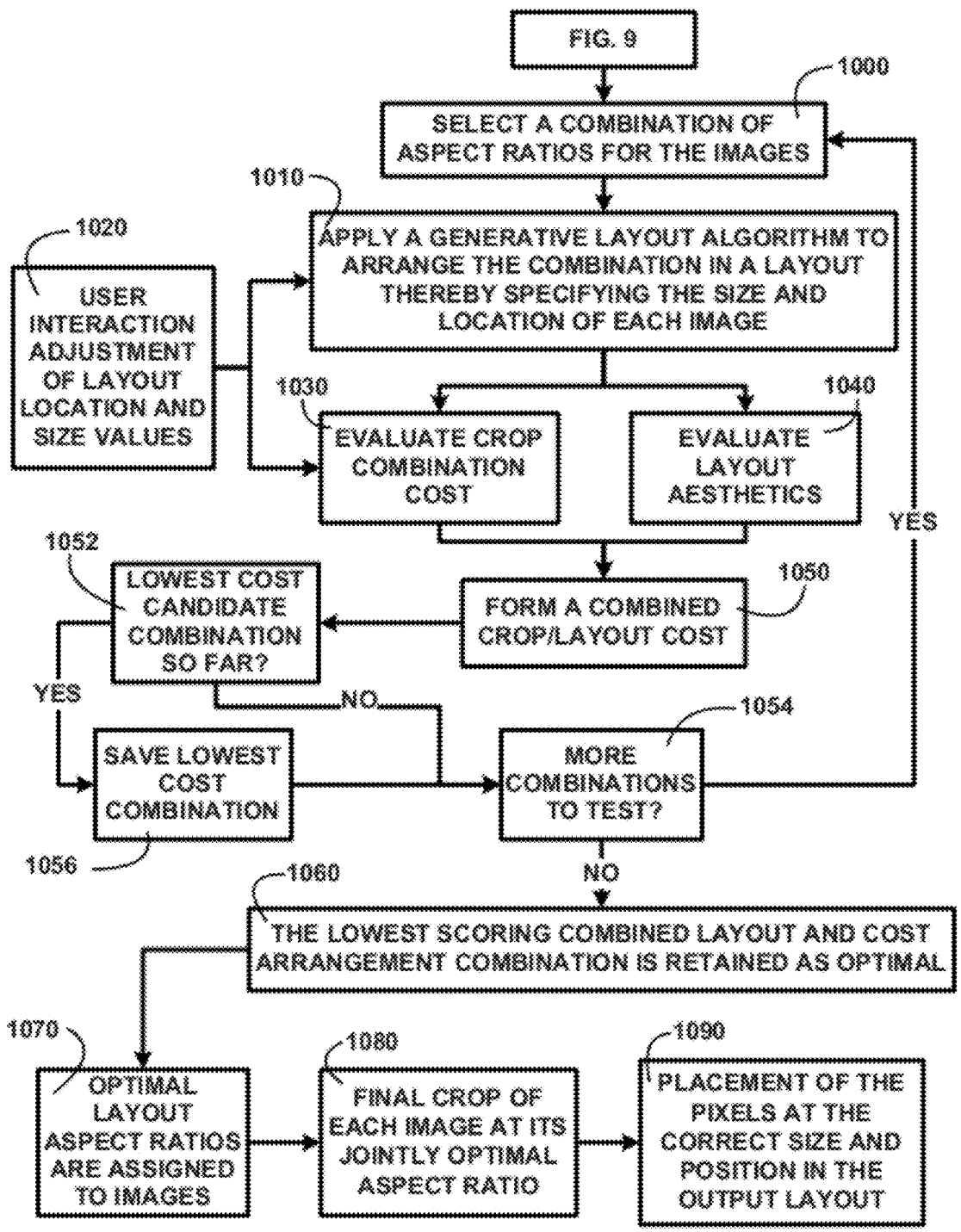
FIG. 10 advances a process from FIG. 9 and shows a flow chart of the generative layout algorithm process module of one embodiment of the present invention.

The joint optimization autocropping and autolayout mode process 180 advances on FIG. 10. This crop cost function 276 allows greater flexibility in adapting an autocrop to a layout adaptation.

Generative Autolayout Process:

FIG. 10 advances a process from FIG. 9 and shows a flow chart of the generative autolayout process module of one embodiment. The crop cost function 276 of FIG. 9 results are processed to the generative autolayout process module 278 of FIG. 2. Optimal cropping of a photo or digital image is placing the salient contents in an aspect ratio that optimally presents those salient contents. In abstract, a layout is defined by a choice of aspect ratio for each image and an arrangement of those aspect ratios within the target layout boundaries.

The simplest form of any layout style is using fixed aspect ratios or templates where the photos or digital images are placed in empty template cells in a layout. The layout target fixed templates are predetermined and have no considerations of the actual photos or any cropping of the photos to be placed. Fixed templates therefore have the disadvantage that there is no flexibility in the aspect ratios of the template cells which limits the potential benefit from cropping. A very large unmanageable set of templates would have to be used to accommodate the images cropped to aspect ratios which suit their content. Or the cropping would have to be done to accommodate a few templates which would result in poor image results.

One solution to this fixed template disconnect in processing is the use of generative layout algorithms. These algorithms take as input the set of image aspect ratios to be placed on the layout page and the aspect ratio for the target page. As output they produce an arrangement of rectangles of the specified aspect ratios which size and position the images on the page according to the style and design criteria implemented by the algorithm. For example, the size and placement of the images is adjusted so that all the specified images fit into an enclosing rectangle which is close to the aspect ratio of the target page in which all the borders between images are the same width.

Generative layout algorithms can typically generate a set of possible layouts for any given set of source images, all of which meet the basic geometric style constraints.

They therefore need to choose one from the set of the possible layouts, based on a measure of layout quality. Typical heuristics used to determine the layout quality include: similarity of area of the image cells; similarity of layout rectangle to target rectangle for optimal efficiency of space coverage; relative size of images as specified by the user or by some automated means of assessing relative importance.

Because generative layout algorithms create a layout to suit a particular set of aspect ratios, they have the advantage that they can accommodate prior auto-cropping which adjusts the aspect ratio of the images to optimally suit the image content. Autocropping improves the images themselves, but also for some layout designs, the layouts in that style are enhanced by using the variety of aspect ratios auto-cropping provides because the resulting layouts are more varied.

The simplest way of combining auto-cropping with generative layout algorithms is to first autocrop all the images, allowing the autocrop algorithm to select what it considers to be the most suitable aspect ratio for each image. Then run the generative layout algorithm, providing the aspect ratios of the cropped images as input. The layout algorithm can then scale and arrange the cropped images according to the style rules it implements.

This simplistic sequential combination means the automatic cropping is done without knowledge of the layout optimization criteria. A particular image set may be auto cropped to generate a set of aspect ratios which layout in a relatively poor way. For example, auto crop may generate too many wide aspect ratios. The user may wish to interact with an existing layout. For example, this can be achieved by adjusting the aspect ratios of other images. If the cropping decisions have already been made for each image, then a typically sub-optimal method will have to be used, such as changing the aspect ratios by reducing the height or width by equal amounts from each side The joint optimization of autocrop and autolayout described in this invention overcomes these limitations. FIG. 10 illustrates some of the processes used in the generative autolayout process module 278 of FIG. 2 to generate optimal autolayout aspect ratios for the set of digital images to be placed in a layout 870 of FIG. 8. In the arrangement or layout of photos or images on a format choosing alternative aspect ratio crops for some images may produce much more pleasing layouts.

The generative autolayout process module 278 of FIG. 2 performs a combined optimization search mode process 1000 to select the optimal autolayout and aspect ratio of images to be placed in a layout developed in consideration of both cropping and layout criteria of one embodiment.

The combined optimization search mode process 1000 searches the space of all possible layouts, as defined, to find the layout with the lowest cost. The cost function used by the generative autolayout process module 278 of FIG. 2 takes into account the cropping cost of each image at the particular aspect ratio used in the layout being evaluated, which it gets from the already calculated crop cost function. When the lowest cost layout has been found, the aspect ratio selected for each of the images is used to select the optimal autocrop rectangle for each image and hence place the autocropped images into the final page layout of one embodiment.

The generative autolayout process module 278 of FIG. 2 performs a cost function of all possible cropping cost combinations of the crop cost values array for multiple aspect ratios 940 of FIG. 9. The search process takes an image at one of the specific aspect ratios from the crop cost function 276 of FIG. 9 array and arranges it on the layout with each of the other images in the layout at one of the specific aspect ratios from the array. A more detailed description of the joint optimization autocropping and autolayout mode process 180 of FIG. 1 is shown in FIG. 10.

Generation of Combinations:

FIG. 10 advances a process from FIG. 9 and shows a flow chart of the generative layout algorithm process module of one embodiment. This process cycles through alternative candidate combinations of aspect ratio choices for the images evaluating each candidate combination to select a combination of aspect ratios for the images 1000. Successive candidate combination choices are formed in one embodiment.

In the simplest embodiment the combinations are taken from the aspect ratio values explicitly recorded in the crop cost table. All combinations are exhaustively tested. The process proceeds to apply a generative layout algorithm to arrange the combination in a layout thereby specifying the size and location of each image 1010. In more sophisticated versions intermediate aspect ratios can be used by interpolating between the explicitly defined values. For example, having completed an initial search of the possibilities to find the optimal combination using the aspect ratio values explicitly recorded in the crop cost table, the process can be repeated using minor perturbations of aspect ratio from the values in the table, to see if a further improved combination can be found. These additional criteria increase the ability of the process to further refine the optimization search and thereby produce improved quality results in the overall layout result of one embodiment.

The number of possible combinations of image aspect ratios is very large. The number of combinations to be processed can be reduced by ignoring any combinations where the crop cost of any one image exceeds a particular threshold. Similarly, if the sum of the crop costs of a particular combination of image aspect ratios exceeds a threshold, that combination can be ignored. These measures are very quick to compute compared to the time taken to create and evaluate a layout of a set of aspect ratios, so the optimization search can be done much more efficiently. For each selected combination of aspect ratios the generic layout algorithm is invoked to arrange the images in the optimal layout possible for that combination in one embodiment.

The generic layout algorithm may take user interaction adjustment of layout location and size values 1020 into account when creating the layouts. In one embodiment a user is shown an initial result of the entire jointly optimized autocrop and autolayout process and invited to make layout adjustments such as increasing the size of an image or changing the position of an image or changing the aspect ratio of an image. If the user makes changes, the entire process of FIG. 10 is repeated. User preferences in relative image size and image position are reflected in the generative layout algorithm results of one embodiment.

Evaluation Criterion:

User preferences in aspect ratio change are reflected by modifying the crop cost table entries for the specified image to favor the users selected aspect ratio. Each layout combination is processed to evaluate crop combination cost 1030 and evaluate layout aesthetics 1040. These are the two evaluation components used for each layout combination. Each layout combination is evaluated by combining the two evaluation components as a weighted sum $C=C1+W*C2$ to form a combined crop/layout cost 1050 where C1 is the cost attributed to the crop costs of the aspect ratios of each image and C2 is the layout cost representing how well the layout meets the aesthetic criteria defined by the generic layout style. W is a weighting value which controls the relative strength of these two components in the joint crop and layout cost, C of one embodiment.

The simplest method of forming C1, the combined crop costs for each of the images, is simply to sum the crop cost values in the crop cost table for each of the images at the aspect ratio used for the image in the combination under test. If aspect ratios are being interpolated, the crop cost value for each image can be interpolated between the nearest defined values in the crop cost table for that image. A more sophisticated technique is to weight the crop cost for each image by the relative area that the image occupies in the layout under test. In this way the crop cost of a large, prominent image is considered to be more salient than the crop cost of an image which occupies less space in the layout under test. Similarly, if the input images are marked with a high salience the crop cost can be weighted more highly for the more desirable images of one embodiment.

The layout cost C2 measures how well the layout of the images meets the design considerations of the generative layout style. Typically this would penalize layouts in which some of the images are very small; layouts which do not make good use of the available area; or layouts where one or more edges are slightly mis-aligned.

Specific details will differ for alternative generative layout styles which apply a generative layout algorithm to arrange the combination in a layout thereby specifying the size and location of each image 1010. When the combined crop/layout cost for the combination has been formed it is compared with the combined crop and layout cost of the lowest cost combination found so far in the process. If the current combination cost being compared results in a yes answer to the comparison question lowest cost candidate combination so far? 1052, then the process proceeds to save the lowest cost combination 1056. At this point the testing of the current combination and arrangement is completed of one embodiment.

The process determines whether there are more combinations to test 1054. If that answer is yes, the process is returned to select a combination of aspect ratios for the images 1000 to make the next arrangement combination and so on until all the arrangement combinations have been processed and received a combined layout and crop cost function score. If there are no more combinations to test then the lowest scoring combined layout and cost arrangement combination is retained as optimal 1060 of one embodiment.

Constructing the Output Layout Image:

At this point the lowest scoring combined layout and cost arrangement combination is retained as optimal 1060. In the final steps optimal layout aspect ratios are assigned to images 1070. The creation of the final crop of each image at its jointly optimal aspect ratio 1080 is performed. The placement of the pixels at the correct size and position in the output layout 1090 is completed.

In embodiments in which the aspect ratio search uses values which are defined in the crop cost table these final steps can be further optimized by saving the x, y and width and height which define the location in the source image where the crop rectangle of the optimal crop with each aspect ratio is positioned. This can be done with minimal additional computation cost at the time that the crop cost table is formed by the crop cost function 276 FIG. 9. This makes the final construction of the layout very efficient due to no new crop computation.

In embodiments where the selected crop locations have not been saved in this manner the processing proceeds to the possible crop rectangles optimization search 255 of FIG. 2. This is repeated to generate the final crop for each image at its respective jointly optimal aspect ratio. Even in this embodiment, where the possible crop rectangles optimization search 255 of FIG. 2 is repeated processing is much faster than starting the autocrop process from the beginning as most of the computational work is in the crop analysis 140 of FIG. 1 of one embodiment.

The joint optimization autocropping and autolayout mode process 180 of FIG. 1 produces increased production with significantly faster processing than two separate autocropping and autolayout processes. The combined process provides a much more detailed coordinated approach to determining the optimal aspect ratios needed for the layout. The autocropping takes the layout into consideration. The joint optimization autocropping and autolayout mode process 180 of FIG. 1 provides greatly enhanced photographic and layout quality.

The invention claimed is:

1. A computer-implemented method for manipulating acquired digital images in a computer system, comprising:
   creating a crop cost array for each of a set of input images with a set of associated aspect ratios, wherein the cost crop array operates and is stored on the computer system and wherein each element of the array holds a lowest crop cost of an input image for a predetermined aspect ratio;
   generating plural possible candidate combinations of aspect ratios for the images, wherein one aspect ratio is generated for each image;
   creating an arrangement of the images for each candidate combination in which each image is cropped to its associated aspect ratio in the candidate combination;
   evaluating each possible arrangement using a combination of a crop cost of each of the images at their selected aspect ratio and a measure of an aesthetic quality of the layout arrangement;
   selecting a layout combination with a lowest combined crop cost and layout evaluation score;
   cropping each image according to a respective aspect ratio in the selected layout combination; and
   arranging the cropped digital images in the selected layout to produce an automatically formatted output layout page.

2. The computer-implemented method of claim 1, further comprising automatically determining the lowest crop cost of each digital image at multiple aspect ratios by evaluating the aesthetic quality of each of a set of possible crop rectangles for each of the multiple aspect ratios and selecting the crop rectangle with the lowest crop cost.

3. The computer-implemented method of claim 2, further comprising using crop border evaluation multiple penalty criteria to automatically evaluate and determine crop cost scores of each autocropped digital image at each of the multiple aspect ratios.

4. The computer-implemented method of claim 2, further comprising dynamically selecting multiple aspect ratios for the crop cost array for each image.

5. The computer-implemented method of claim 4, wherein the multiple aspect ratios are selected such that the crop cost varies by a smallest amount between adjacent elements of the crop cost array.

6. The computer-implemented method of claim 3, further comprising:
   storing the crop cost score in the crop cost array for retrieval as a crop cost component; and
   storing the coordinates of the optimal crop shape for each aspect ratio in the crop cost array for retrieval for autocropping for aspect ratios used when the final construction of the layout composite image is built as no new crop computation is required.

7. The computer-implemented method of claim 1, wherein the candidate combination layout arrangement specifies the location and size of each image on an output page of pre-specified dimensions.

8. The computer-implemented method of claim 1, wherein each layout combination is automatically scored by combining the crop cost component score and the layout cost component score to form a combined crop and layout evaluation score.

9. The computer-implemented method of claim 8, wherein the combination of each image's crop cost and layout cost weights the crop cost of each image according to the area that image occupies in the layout.

10. The computer-implemented method of claim 1, wherein after finding a preferred layout and combination of aspect ratios using the values defined in the crop cost arrays, a further optimization stage tests additional candidate combinations of image aspect ratios formed with minor perturbations of aspect ratio from those selected.

11. The computer-implemented method of claim 10, wherein a crop cost for perturbed aspect ratio is estimated by interpolating between the neighboring crop cost values in the crop cost array.

12. The computer-implemented method of claim 10, wherein a crop cost for perturbed aspect ratio is calculated by re-running the crop cost evaluation function for the required aspect ratio.

13. A non-transitory computer recordable medium configured to execute instructions for manipulating an acquired digital image, the instructions causing the following steps to occur, comprising:
   creating a crop cost array for each of a set of input images with a set of corresponding aspect ratios, wherein the cost crop array operates and is stored on the computer system and wherein each element of the array holds a lowest crop cost of an input image for a predetermined aspect ratio;
   generating plural possible candidate combinations of aspect ratios for the images, wherein one aspect ratio is generated for each image;

creating an arrangement of the images when each image is cropped to its associated aspect ratio in the candidate combinations;

evaluating each possible layout combination using a combination of a crop cost of each of the images at their selected aspect ratio and a measure of an aesthetic quality of the layout arrangement;

identifying a lowest scoring possible crop border of each image at each of the corresponding aspect ratios; and using the aspect ratios to generate plural possible layout combinations of the digital images.

14. The non-transitory computer recordable medium of claim 13, further comprising evaluating each possible layout combination using crop border evaluation multiple penalty criteria and selecting a layout combination with a lowest combined crop and layout evaluation score.

15. The non-transitory computer recordable medium of claim 13, further comprising using a layout aesthetics criteria cost to produce a layout cost component score of the layout combination and using crop costs associated with multiple crop borders of the images that are placed in a layout format space for arranging the cropped digital images in a layout to produce an automatically formatted output layout page.

16. A digital image manipulation system for automatically cropping acquired digital images, comprising:

a memory device configured to store acquired digital images;

a crop cost array having elements, wherein each element of the array holds a lowest crop cost of an input image for a predetermined aspect ratio of each digital image;

plural possible candidate combinations of the aspect ratios configured to be generated for the images, wherein one aspect ratio is generated for each image;

an arrangement of the images configured to be created when each image is cropped to its associated aspect ratio in the candidate combinations; and plural possible layout combinations configured to be evaluated using a combination of a crop cost of each of the images at their selected aspect ratio and a measure of an aesthetic quality of the layout arrangement, wherein a layout combination with a lowest combined crop cost and layout evaluation score is selected.

17. The digital image manipulation system of claim 16, wherein each image according to a respective aspect ratio in the selected layout combination is cropped and wherein the cropped digital images in the selected layout are arranged to produce an automatically formatted output layout page.

18. The digital image manipulation system of claim 16, further comprising a selection module configured to automatically select a lowest crop cost score for each digital image at each of the multiple aspect ratios as a crop cost component.

19. The digital image manipulation system of claim 16, further comprising an arrangement module configured to automatically create an arrangement of the acquired digital images in the candidate combination under evaluation in the automatically formatted output layout page.

20. The digital image manipulation system of claim 16, wherein the aesthetics of the layout criteria and crop costs associated with multiple crop borders of the images that are placed in a layout format space are configured to be used for arranging the cropped digital images in a layout to produce an automatically formatted output layout page.

* * * * *

UNITED STATES PATENT AND TRADEMARK OFFICE
CERTIFICATE OF CORRECTION

PATENT NO. : 8,180,178 B2
APPLICATION NO. : 12/491087
DATED : May 15, 2012
INVENTOR(S) : Stephen Philip Cheatle Page 1 of 1

It is certified that error appears in the above-identified patent and that said Letters Patent is hereby corrected as shown below:

In column 17, lines 46-47, in Claim 1, delete "cost crop" and insert -- crop cost --, therefor.

In column 18, line 61, in Claim 13, delete "cost crop" and insert -- crop cost --, therefor.

Signed and Sealed this
Twenty-fifth Day of December, 2012

David J. Kappos
*Director of the United States Patent and Trademark Office*